Patented Jan. 24, 1939

2,144,675

UNITED STATES PATENT OFFICE 2,144,675

PLASTER BANDAGE

John Keith Audley-Charles, Toronto, Ontario, Canada, assignor, by mesne assignments, to Frank Worrall, Toronto, Ontario, Canada No Drawing. Application October 12, 1935, Serial No. 44,681

1 Claim. (Cl. 128—91)

The principal objects of this invention are to materially reduce the physical pain and discomfort experienced by patients in the removal of plastic bandages from the body and to greatly facilitate the work of the physician in the removal operation.

The principal feature of the invention consists in incorporating into the plaster of Paris mixture, which is applied to a bandage fabric, a suitable material or materials which will readily absorb moisture at a moderate temperature, and will expand under such moisture application to effect the rupture of the hardened plaster of Paris structure and cause the rapid disintegration of the rigid bandage, thereby permitting of the easy removal of same from the bandaged part of the patient's body.

In the use of plaster of Paris bandages it has been customary to incorporate into a quantity of powdered plaster, certain materials which have a chemical reaction to either accelerate or retard the crystallization of the plaster, and it has also been found desirable to incorporate in the plaster mixture various adhesive substances such as sugar, dextrine, gum arabic or starch to form a binder to hold the plaster particles and to toughen the ultimate "cast", but although such substances have been used, the "cast" requires to be cut or broken away from the body of the patient and this operation is frequently extremely distressing and painful.

I have produced a mixture of plaster of Paris with other substances which, while being sufficiently rigid and strong may be very readily disintegrated so as to enhance its removal. This mixture comprises the use of plaster of Paris and starch in a substantially large proportion preferably in the form of cassava starch and potato starch. It is found in practice that a combination of these two starches in substantially equal proportions, when mixed with approximately double the quantity of plaster of Paris, produces a very effective compound.

In carrying this invention into practice, I preferably prepare a mixture of

| | | |
|---|---|---|
| Plaster of Paris (finely ground) | ounce, troy_ | 14 |
| Cassava starch | do____ | 4 |
| Potato starch | do____ | 4 |
| Potassium sulphate | scruples__ | 3 |
| Borax | drachm__ | 1 |

The above ingredients are thoroughly mixed together, so that the particles of each are uniformly distributed and they are then applied in powder form to a suitable textile bandage and rolled to a thickness ranging from $\frac{1}{16}$ inch to $\frac{1}{8}$ inch. The bandage is then cut in suitable lengths and rolled dry and packaged.

When the bandage is to be used, the roll is removed from its package and immersed in tepid water for a brief period, preferably about one half a minute, and it is then applied to the patient in the usual manner. The quantity of potassium sulphate may be varied to lengthen or shorten the "setting" period.

When it is desired to remove the bandage, it is wetted by immersion or otherwise with water at a temperature of approximately 105° F. to 110° F. and the water is readily absorbed by the starches and distributed throughout the mass. The water permeates the starches with the immediate result that the starch cells are caused to expand, and they exert sufficient force to break down the plaster of Paris structure surrounding same and the bandage rapidly disintegrates and can then be easily and quickly removed.

It must be understood that, while the preferred admixture of starches with plaster of Paris has been given, the forms of starch and the proportions may be altered providing that a structure of "cast" is produced, in which the plaster of Paris structure has embedded therein sufficient starch particles of a quality which will readily absorb applied moisture and conduct same throughout the structure and expand with sufficient force to break down the plaster structure.

I have described this invention as applied to surgical bandages, but it will be readily understood that the peculiar quality of first effecting the setting of the plaster and then accomplishing its dis-integration by the application of water may be applied to other uses, such as for instance in sculpture work, where such a composition may be used to great advantage in the making of the mould in which the final "cast" is produced to enable the removal of the mould from the cast with the least amount of difficulty and danger of injuring the cast.

What I claim as my invention is:—

A surgical bandage comprising in combination, a strip of textile material, an admixture of substantially 14 parts of plaster of Paris in dry powdered form with substantially four parts of cassava starch and four parts of potato starch, both in dry powdered form, and a suitable accelerator to regulate the period of "setting" of the mixture when moistened, said mixture being incorporated with said textile strip and characterized by its hard setting and easy subsequent disruption and removal by application of water at a temperature which may safely be applied to the human body.

JOHN KEITH AUDLEY-CHARLES.